(12) United States Patent
Li et al.

(10) Patent No.: US 7,008,550 B2
(45) Date of Patent: Mar. 7, 2006

(54) METHOD FOR FORMING A READ TRANSDUCER BY ION MILLING AND CHEMICAL MECHANICAL POLISHING TO ELIMINATE NONUNIFORMITY NEAR THE MR SENSOR

(75) Inventors: Jui-Lung Li, San Jose, CA (US); Jyh-Shuey Lo, San Jose, CA (US)

(73) Assignee: Hitachi Global Storage Technologies Netherlands B.V., (NL)

( * ) Notice: Subject to any disclaimer, the term of this patent is extended or adjusted under 35 U.S.C. 154(b) by 306 days.

(21) Appl. No.: 10/671,085

(22) Filed: Sep. 25, 2003

(65) Prior Publication Data

US 2005/0067372 A1    Mar. 31, 2005

(51) Int. Cl.
*B44C 1/22* (2006.01)
*G11B 5/127* (2006.01)
*H04R 31/00* (2006.01)

(52) U.S. Cl. .................. 216/22; 29/603.01; 29/603.07

(58) Field of Classification Search ............... 216/22; 438/3
See application file for complete search history.

(56) References Cited

U.S. PATENT DOCUMENTS

| 6,315,875 | B1 * | 11/2001 | Sasaki .............. 204/192.34 |
| 2002/0089794 | A1 * | 7/2002 | Chang et al. .......... 360/317 |
| 2004/0027730 | A1 * | 2/2004 | Lille ...................... 360/322 |
| 2005/0067374 | A1 * | 3/2005 | Baer et al. ............... 216/22 |

* cited by examiner

*Primary Examiner*—Parviz Hassanzadeh
*Assistant Examiner*—Roberts Culbert
(74) *Attorney, Agent, or Firm*—Chambliss, Bahner & Stophel, P.C.; David W. Lynch

(57) ABSTRACT

A method for forming a read transducer by ion milling and chemical mechanical polishing to eliminate nonuniformity near the MR sensor is disclosed. The resist mask is eliminated in the read transducer formation process so that the thickness of the layers near the read transducer has a uniform thickness.

31 Claims, 21 Drawing Sheets

(ABS)

METHOD FOR FORMING A READ TRANSDUCER BY ION MILLING AND CHEMICAL MECHANICAL POLISHING TO ELIMINATE NONUNIFORMITY NEAR THE MR SENSOR

BACKGROUND OF THE INVENTION

1. Field of the Invention

This invention relates in general to magnetic read transducers, and more particularly to a method for forming a read transducer by ion milling and chemical mechanical polishing to eliminate nonuniformity near the MR sensor.

2. Description of Related Art

The heart of a computer is an assembly that is referred to as a magnetic disk drive. The disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS to cause the slider to ride on an air bearing a slight distance from the surface of the rotating disk. The write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A write gap layer between the first and second pole piece layers forms a magnetic gap at an air bearing surface (ABS) of the write head. The pole piece layers are connected at a back gap. Current conducted to the coil layer induces a magnetic field across the magnetic gap between the pole pieces. This field fringes across the magnetic gap for the purpose of writing information in tracks on moving media, such as the circular tracks on the aforementioned rotating disk, or a linearly moving magnetic tape in a tape drive.

The read head includes first and second shield layers, first and second gap layers, a read sensor and first and second lead layers that are connected to the read sensor for conducting a sense current through the read sensor. The first and second gap layers are located between the first and second shield layers and the read sensor and the first and second lead layers are located between the first and second gap layers. The distance between the first and second shield layers determines the linear read density of the read head. The read sensor has first and second side edges that define a track width of the read head. The product of the linear density and the track density equals the real density of the read head, which is the bit reading capability of the read head per square inch of the magnetic media.

Rows and columns of combined read and write heads are made on a wafer substrate located in various chambers where layers are deposited and then defined by subtractive processes. A plurality of substrate wafers may be located on a turntable which rotates within the chamber and which may function as an anode. One or more targets, which comprise materials that are to be deposited on the wafer substrates, may also be located in the chamber. The target functions as a cathode and a DC or RF bias may be applied to the cathode and/or the anode. The chamber contains a gas, typically argon (Ar), which is under a predetermined pressure. Material is then sputtered from a target onto the wafer substrates forming a layer of the desired material. Layers may also be deposited by ion beam deposition wherein an ion beam gun directs ionized atoms (ions) onto a target, which causes the target to sputter material on the wafer substrate. A subtractive process may employ a gas in the chamber, such as argon (Ar), under pressure, which causes sputtering of the material from portions of the wafer substrate not covered by a mask. Alternatively, the subtractive process may employ an ion beam gun that discharges high velocity ions, such as argon (Ar) ions, which impact and remove portions of the wafer substrate that are not covered by a mask.

First and second hard bias and lead layers are typically joined at first and second side edges of the read sensor in what is known in the art as a contiguous junction. A first step in making this junction is forming a read sensor material layer over the entire wafer. Then, for each magnetic head a photoresist is formed over the desired read sensor site with first and second side edges defining the first and second side edges of the read sensor. A subtractive process, such as ion milling, is employed for removing the entire read sensor material layer except the read sensor under the photoresist. While the photoresist is still in place a hard bias and lead layer material is deposited on the entire wafer substrate. The photoresist is then removed lifting off the bias and lead layer material deposited thereon. The result is that a hard bias and lead layer makes good abutting engagement with the first side edge of the read sensor. However, because the hard bias layer is deposited with a resist structure, the layer near the edges of the sensor layer has a nonuniform thickness.

It can be seen that there is a need for a method for forming a read transducer by ion milling and chemical mechanical polishing to eliminate nonuniformity near the MR sensor.

SUMMARY OF THE INVENTION

To overcome the limitations in the prior art described above, and to overcome other limitations that will become apparent upon reading and understanding the present specification, the present invention discloses a method for forming a read transducer by ion milling and chemical mechanical polishing to eliminate nonuniformity near the MR sensor.

The present invention solves the above-described problems by eliminating the resist mask in the read transducer formation process so that the thickness of the layers near the read transducer has a uniform thickness.

A method in accordance with the principles of the present invention includes forming, over a sensor, a first hard layer having a width for defining a width of the sensor, forming, on a first and second side of the sensor and hard layer, a hard bias layer having a height substantially equal to a height of the sensor, forming a lead layer over the hard layer and the hard bias layer, forming a second hard layer over the lead layer, forming, over the second hard layer, a top mask layer having an opening substantially equal to the width of the sensor, removing a portion of the second hard layer and a portion of the lead layer accessible through the opening in the top mask layer, removing the top mask layer and shaping a remaining portion of the second hard layer and a remaining portion of the lead layer to a desired form.

Another embodiment of the present invention also provides a method for forming a read transducer. The method includes forming a sensor layer over a first gap layer, forming, over the sensor layer, a first hard layer, forming over the first hard layer a photoresist having a width equal to a desired width of a sensor, removing portions of the first hard layer and the sensor layer not blocked by the photoresist to form a sensor, removing the photoresist, forming a hard bias layer on a first and second side of remaining portions of the first hard layer and sensor layer and processing a second hard layer, a lead layer and a masking layer formed over the hard bias layer and the remaining portions of the first hard layer and sensor layer using CMP polishing, ion etching and ion milling to prevent nonuniformity of layer thickness near the sensor.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method for forming a read transducer by ion milling and chemical mechanical polishing to eliminate nonuniformity near the MR sensor. By eliminating the resist mask in the read transducer formation process, the thickness of the layers near the read transducer has a uniform thickness.

Figure 1:
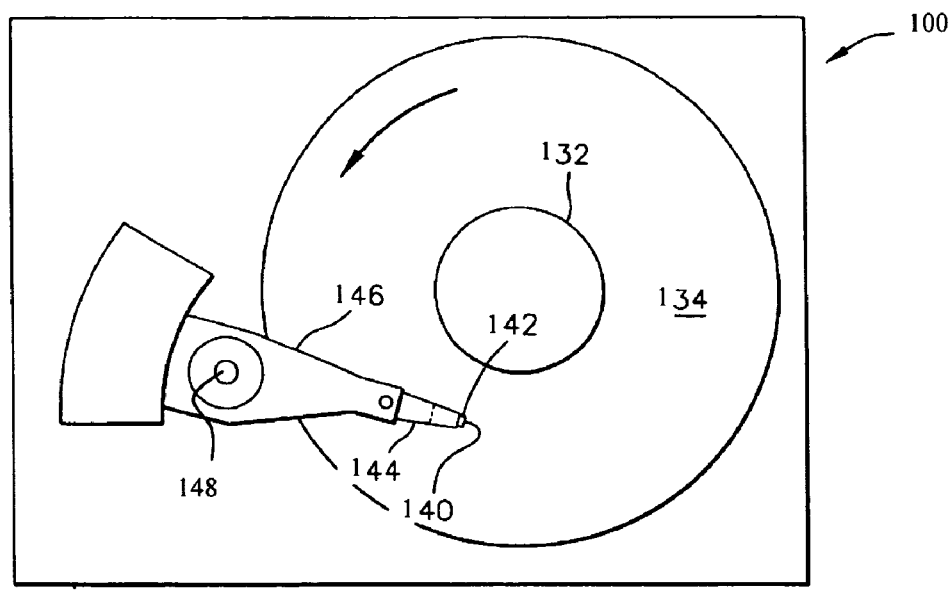
FIG. 1 illustrates a storage system according to the present invention.

FIG. 1 illustrates a storage system 100 according to the present invention. In FIG. 1, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
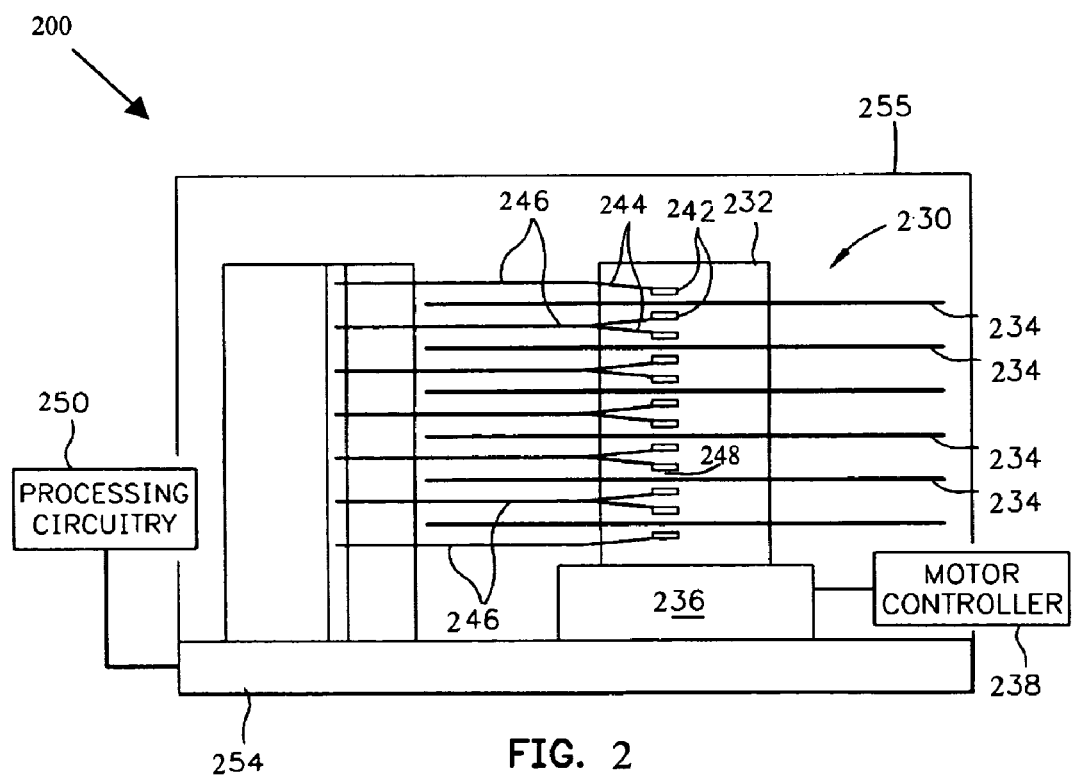
FIG. 2 illustrates one particular embodiment of a storage system according to the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air bearing surface (ABS) 248. The magnetic head may then be employed for writing information to multiple circular tracks on the surface of the disk 234, as well as for reading information therefrom.

Figure 3:
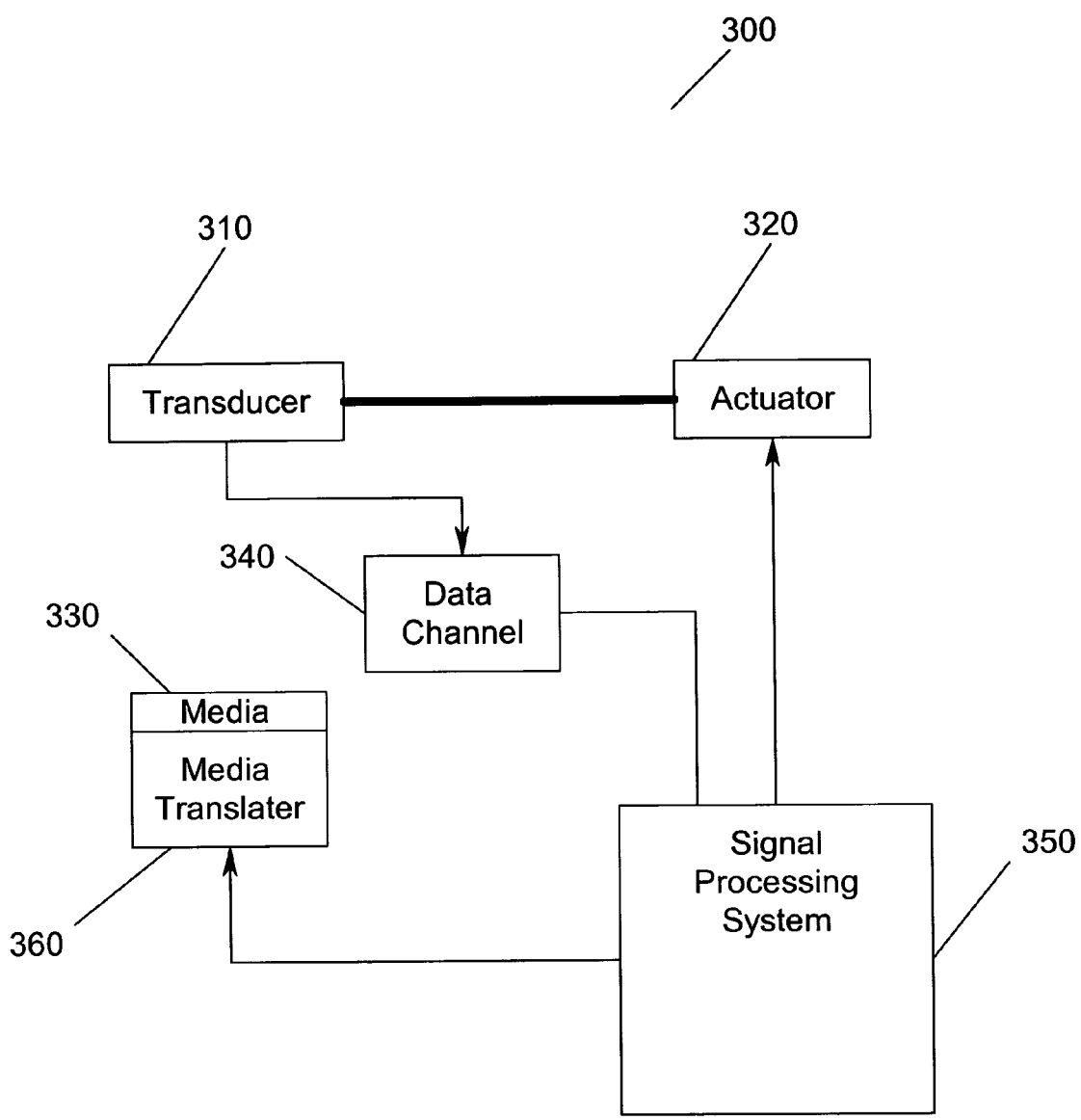
FIG. 3 illustrates a storage system according to the present invention.

FIG. 3 illustrates a storage system 300. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the transducer 310. Nevertheless, the present invention is not meant to be limited to a particular type of storage system 300 or to the type of media 330 used in the storage system 300.

Figure 4:
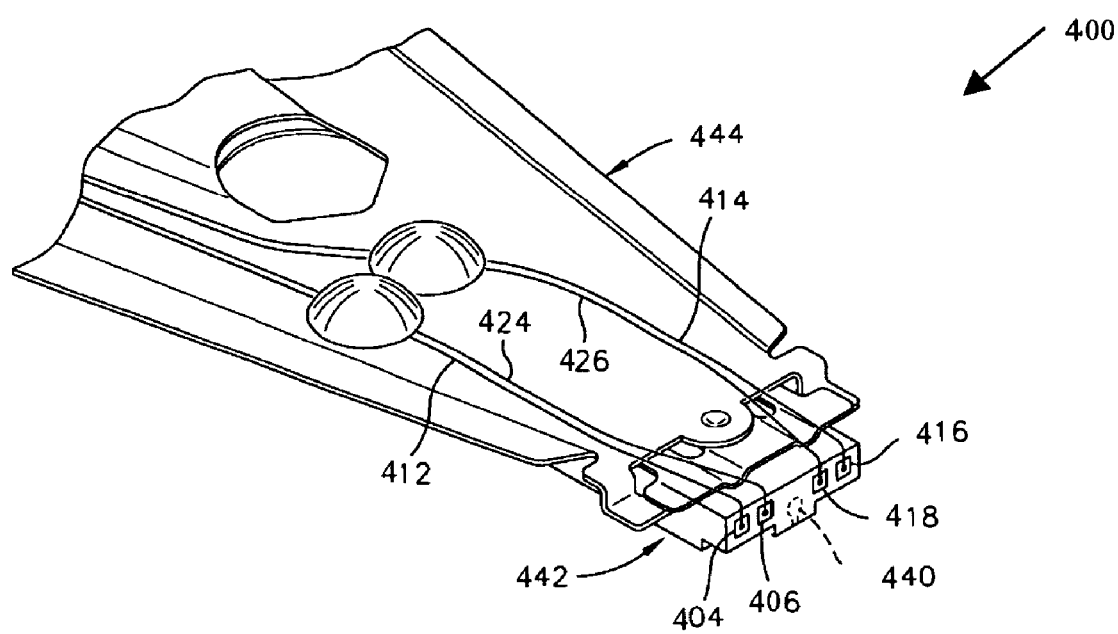
FIG. 4 is an isometric illustration of a suspension system for supporting a slider having a magnetic head mounted thereto.

FIG. 4 is an isometric illustration of a suspension system 400 for supporting a slider 442 having a magnetic head mounted thereto. In FIG. 4 first and second solder connections 404 and 406 connect leads from the sensor 440 to leads 412 and 424 on the suspension 444 and third and fourth solder connections 416 and 418 connect the coil to leads 414 and 426 on the suspension 444. However, the particular locations of connections may vary depending on head design.

Figure 5:
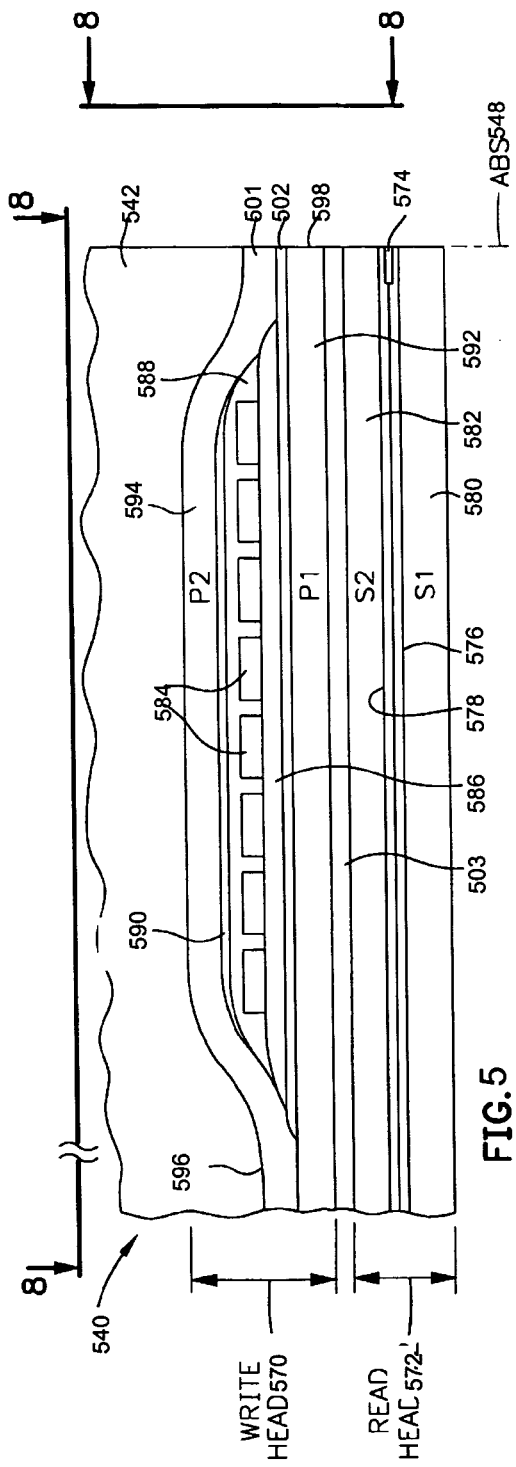
FIG. 5 is a side cross-sectional elevation view of a magnetic head.
Figure 6:
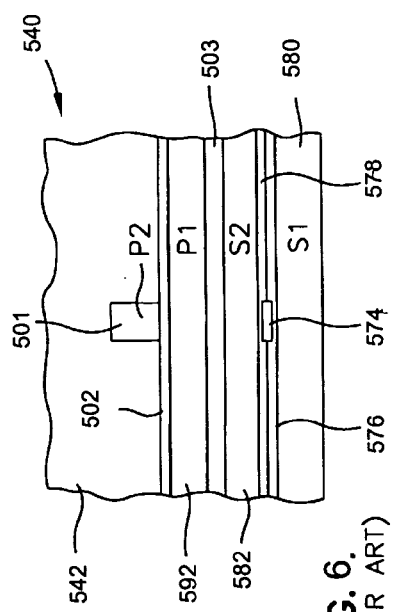
FIG. 6 is an air bearing surface (ABS) view of the magnetic head of FIG. 5.

FIG. 5 is a side cross-sectional elevation view of a magnetic head 540. The magnetic head 540 includes a write head portion 570 and a read head portion 572 disposed on slider 542. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current $I_s$ conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS 548. The first pole piece layer 592 is separated from the second shield layer 582 by an insulation layer 503.

Figure 7:
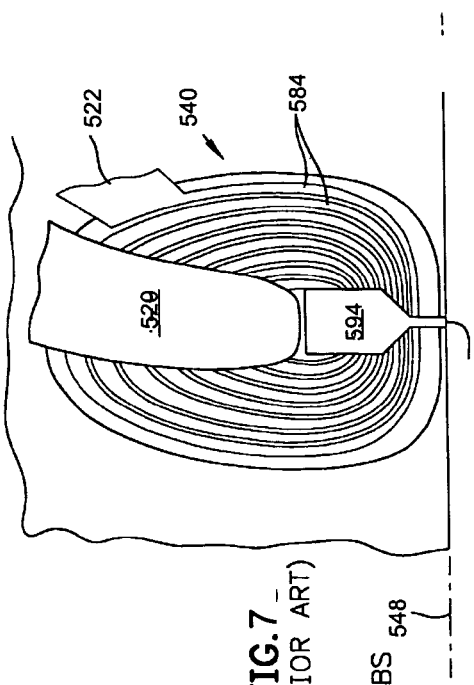
FIG. 7 illustrates the connect leads coupled to the coil for the write pole piece.

FIG. 7 illustrates a view of the connect leads 520, 522 coupled to the coil 584 for the write pole piece 594. As shown in FIGS. 4–7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

Figure 8:
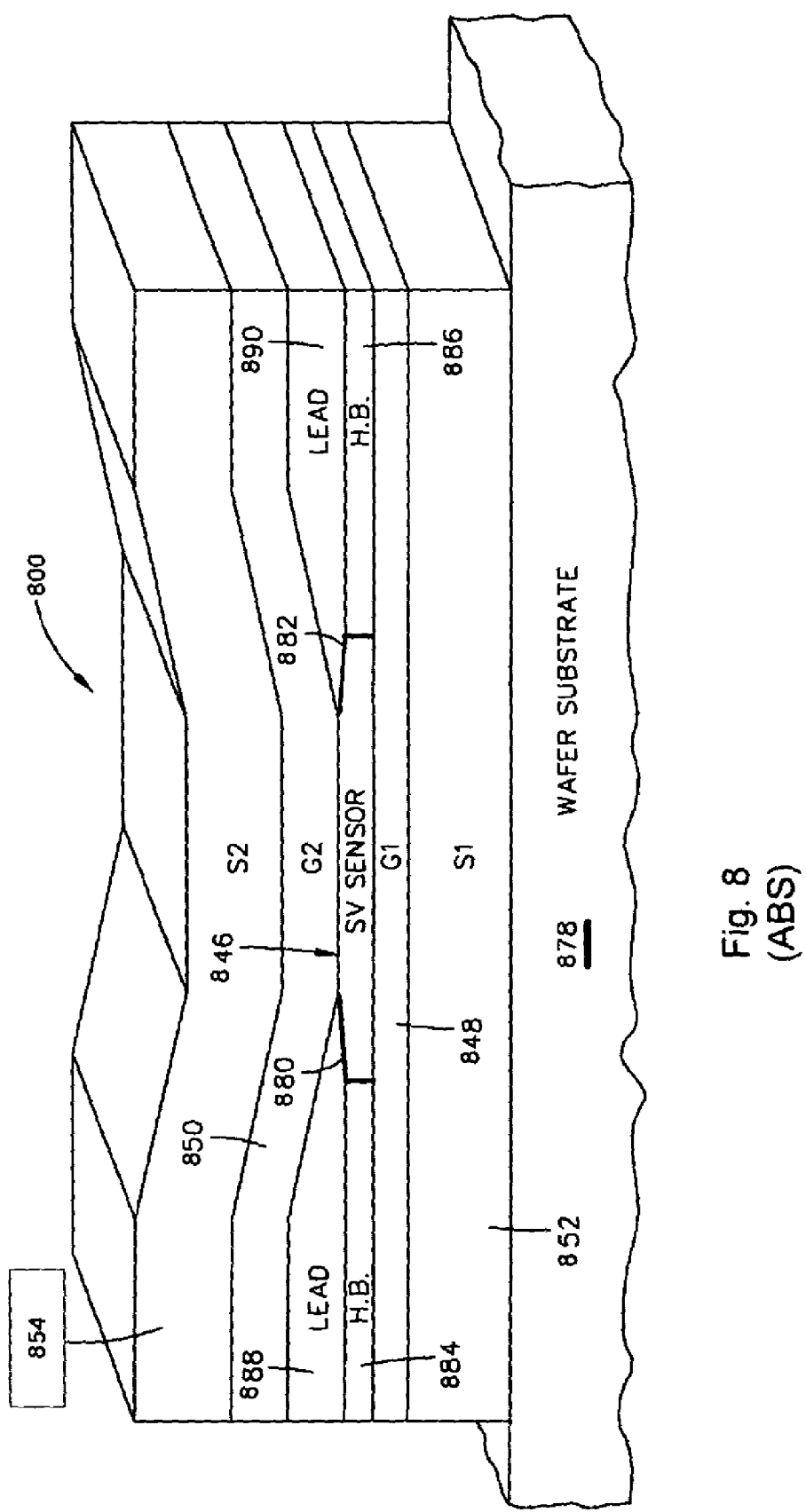
FIG. 8 is an ABS isometric schematic illustration of the read head portion of the magnetic head assembly of FIG. 5.

FIG. 8 is an enlarged isometric ABS illustration 800 of the read head portion of the magnetic head assembly in FIG. 5. The read head 800 is constructed on a wafer substrate 878. The multilayered sensor 846 has first and second side edges 880 and 882 that are connected to first and second hard bias layers (HB) 884 and 886 and first and second lead layers 888 and 890.

During the construction of the read head 810, the multiple layers of the read sensor 846, hard bias 884, 886 and lead layers 888, 890 connected to the sensor 846 and read gap layers 848, 850 surrounding the sensor are typically sputter deposited. The read gap layers 848, 850 are disposed between first and second shield layers 853, 854. FIGS. 9–24 illustrate a method for forming a read transducer by ion milling and chemical mechanical polishing to eliminate nonuniformity near the MR sensor according to an embodiment of the present invention. By eliminating the resist mask in the read transducer formation process, the thickness of the layers near the read transducer has a uniform thickness.

Figure 9:
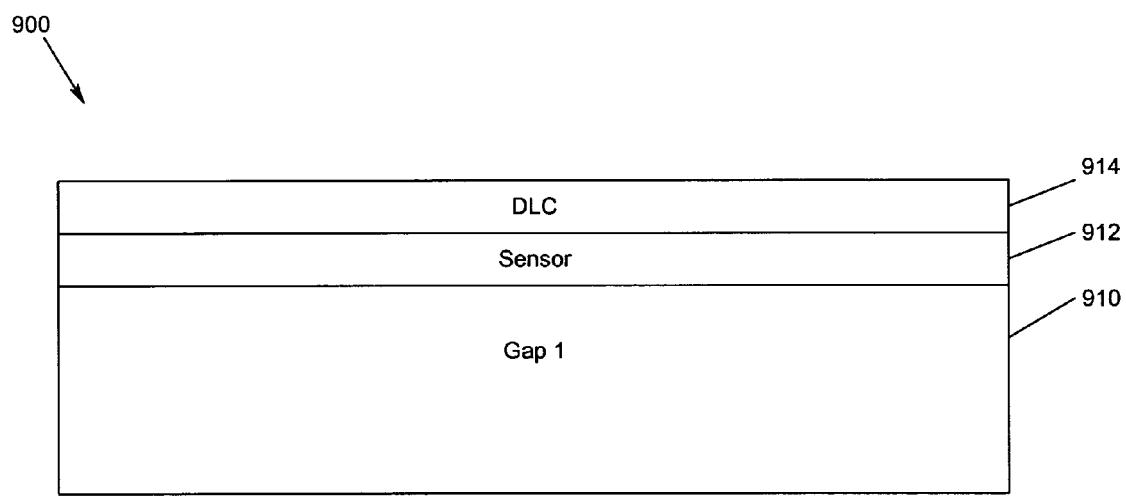
FIG. 9 illustrates a stage in the method for forming a read transducer to eliminate nonuniformity near the MR sensor according to an embodiment of the present invention.

FIG. 9 illustrates a stage 900 in the method for forming a read transducer to eliminate nonuniformity near the MR sensor according to an embodiment of the present invention. In FIG. 9, a first gap layer, gap 1 910, is formed. A sensor 912 is formed over gap 1 910. A hard layer, such as diamond-like carbon (DLC) layer 914, is formed over the sensor 912. DLC layer 914 is known for its hardness, electrical insulation, chemical inertness, surface smoothness and resistance to wear.

Figure 10:
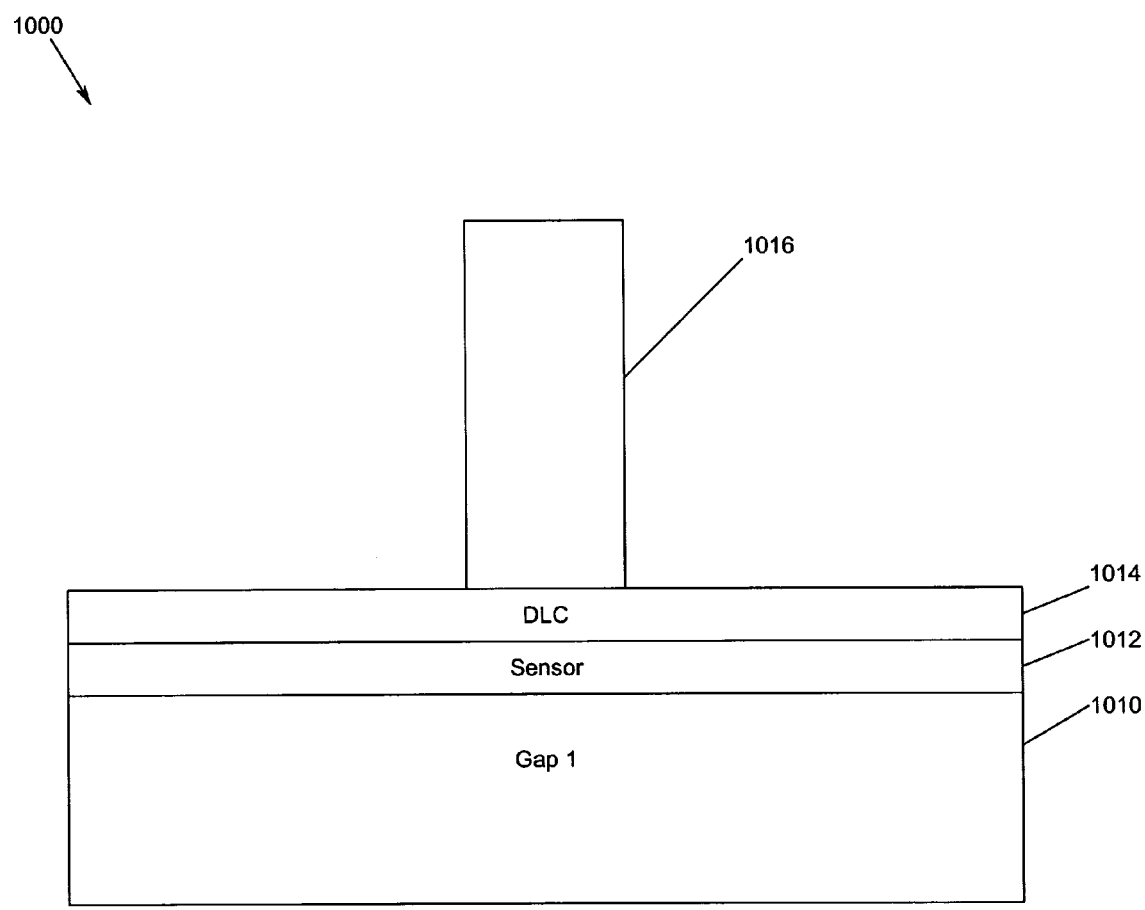
FIG. 10 illustrates another stage in the method for forming a read transducer to eliminate nonuniformity near the MR sensor according to an embodiment of the present invention.

FIG. 10 illustrates another stage 1000 in the method for forming a read transducer to eliminate nonuniformity near the MR sensor according to an embodiment of the present invention. In FIG. 10, the sensor layer 1012 is disposed over the gap 1 layer 1010 and a photoresist 1016 is formed over the DLC layer 1014.

Figure 11:
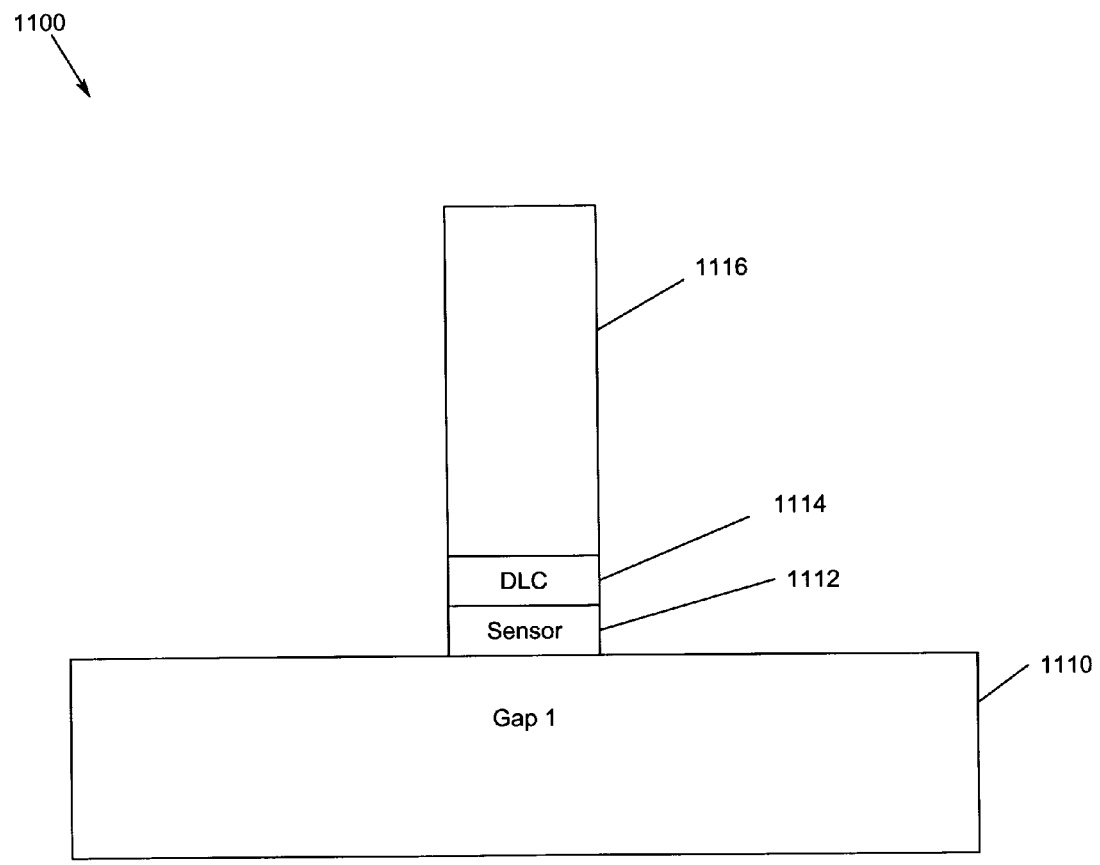
FIG. 11 illustrates the next stage in the method for forming a read transducer to eliminate nonuniformity near the MR sensor according to an embodiment of the present invention.
Figure 12:
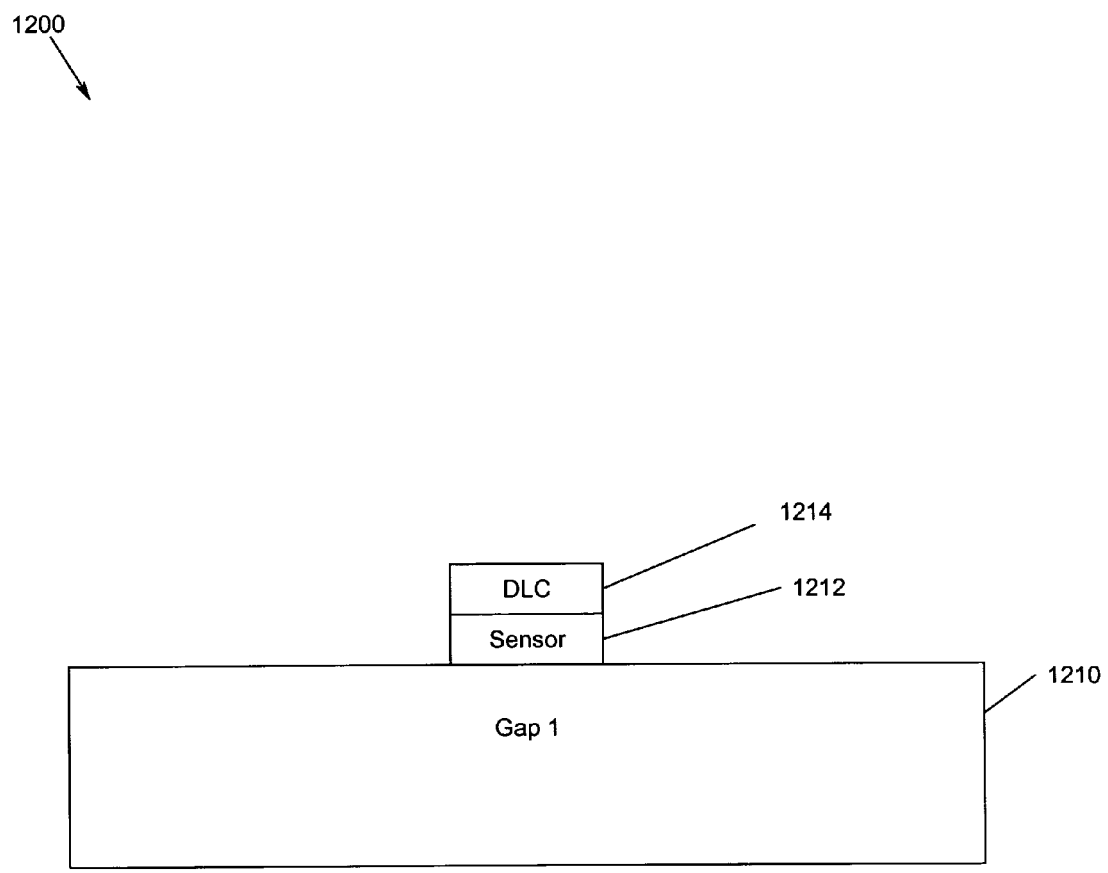
FIG. 12 shows the next stage wherein the photoresist is removed according to an embodiment of the present invention.

FIG. 11 illustrates the next stage 1100 in the method for forming a read transducer to eliminate nonuniformity near the MR sensor according to an embodiment of the present invention. In FIG. 11, the sensor layer 1112 and DLC layer 1114 are ion milled down to the gap 1 layer 1110. The photoresist 1116 masks a portion of the sensor layer 1112 and DLC layer 1114 to provide a sensor 1112 having a desired width. In other words, the width of the photoresist 1116 is chosen to produce a desired width of the sensor 1112. FIG. 12 shows the next stage 1200 wherein the photoresist 1116 is removed leaving the DLC layer 1214, the sensor 1212 and the gap 1 layer 1210.

Figure 13:
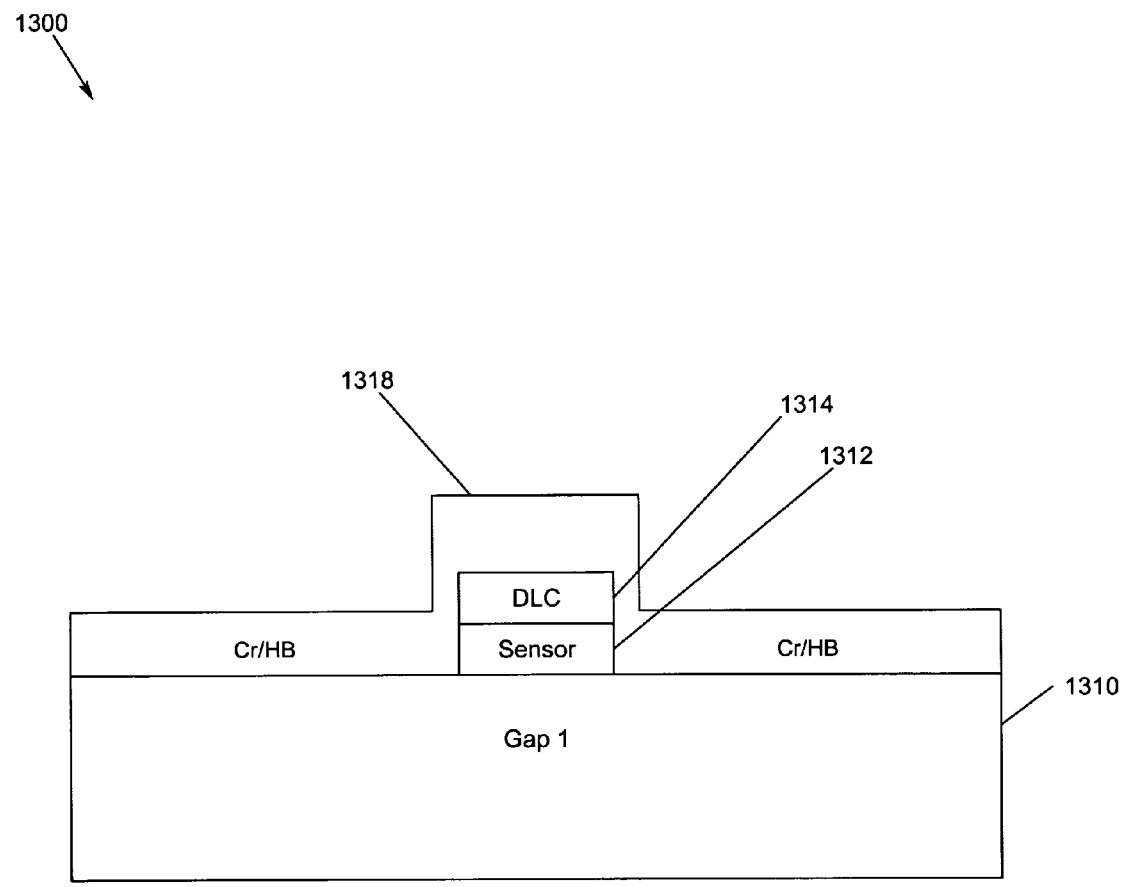
FIG. 13 illustrates the next stage wherein a hard bias layer is formed by deposition according to an embodiment of the present invention.
Figure 14:
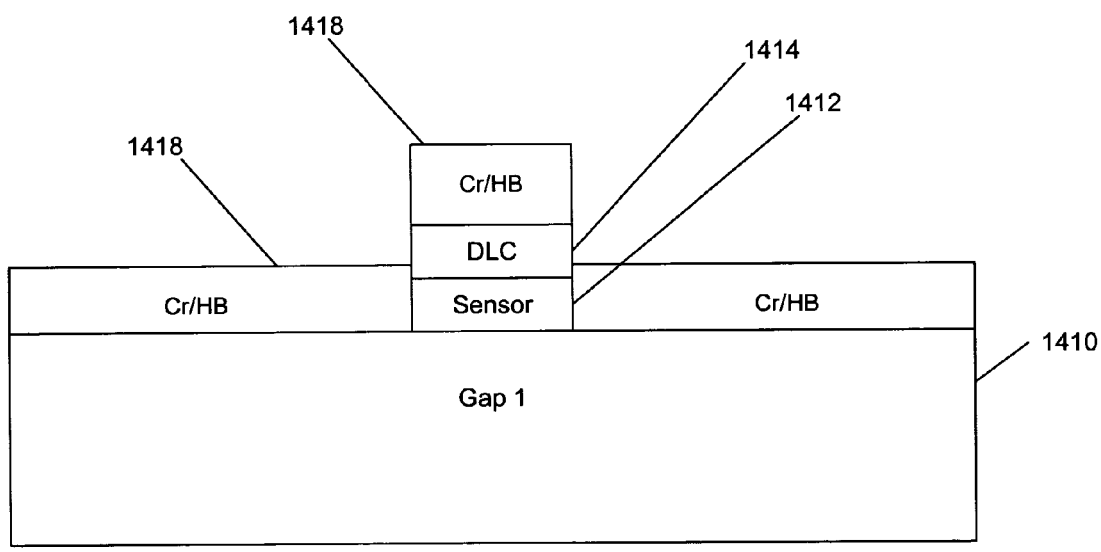
FIG. 14 shows the hard bias layer ion milled down to a level that is above the level of the sensor according to an embodiment of the present invention.

FIG. 13 illustrates the next stage 1300 wherein a hard bias layer 1318, such as a Chromium (Cr)/hard bias layer, is formed by deposition. The hard bias layer 1318 is formed over the sensor layer 1312, DLC layer 1314 and gap 1 layer 1310. In FIG. 14, the hard bias layer 1418 is ion milled down to a level that is above the level of the sensor 1412. The sensor 1412 is disposed over the gap 1 layer 1410. A portion of the hard bias layer 1418 is left over the DLC layer 1414.

Figure 15:
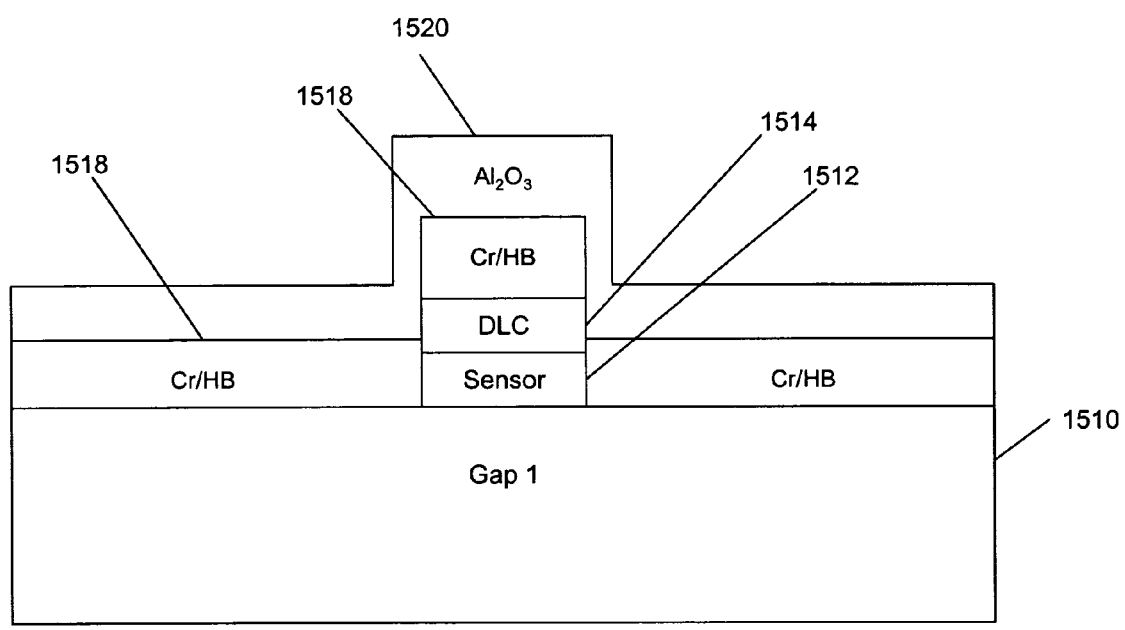
FIG. 15 shows the deposition of an $Al_2O_3$ layer over the ion milled hard bias layer according to an embodiment of the present invention.
Figure 16:
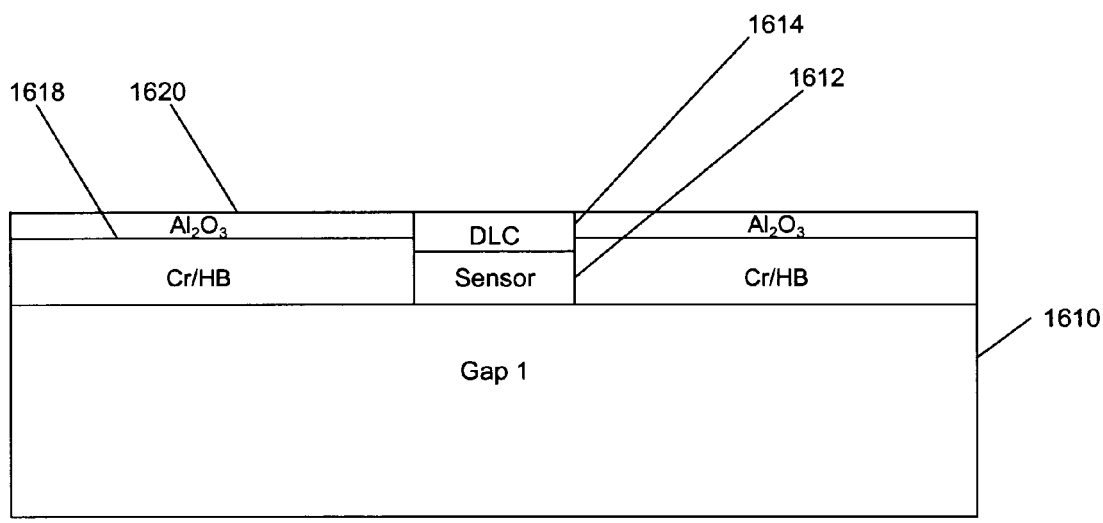
FIG. 16 shows the CMP polishing of the $Al_2O_3$ layer down to the level of the DLC layer according to an embodiment of the present invention.

FIG. 15 shows the deposition of an $Al_2O_3$ layer 1520 over the ion milled hard bias layer 1518. The sensor 1512 is disposed over the gap 1 layer 1510. A portion of the hard bias layer 1518 is disposed over the DLC layer 1514. FIG. 16 shows the $Al_2O_3$ layer 1620 CMP polished over the hard bias layer 1618 down to the level of the DLC layer 1614. The thickness of the DLC layer 1614 may be reduced during this process. The sensor 1612 is disposed over the gap 1 layer 1610.

Figure 17:
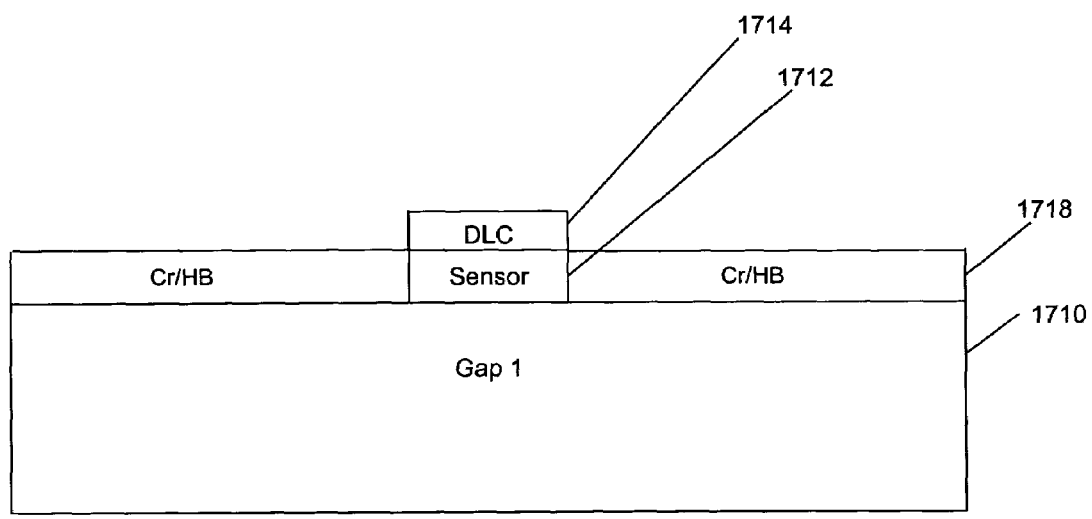
FIG. 17 shows the $Al_2O_3$ layer removed using, for example, a wet etching according to an embodiment of the present invention.

FIG. 17 shows the $Al_2O_3$ layer 1620 of FIG. 16, which is over the hard bias layer 1718, removed using, for example, a wet etching. The DLC layer 1714 and the hard bias layer 1718 may be thinned during this process. The sensor 1712 is disposed over the gap 1 layer 1710.

Figure 18:
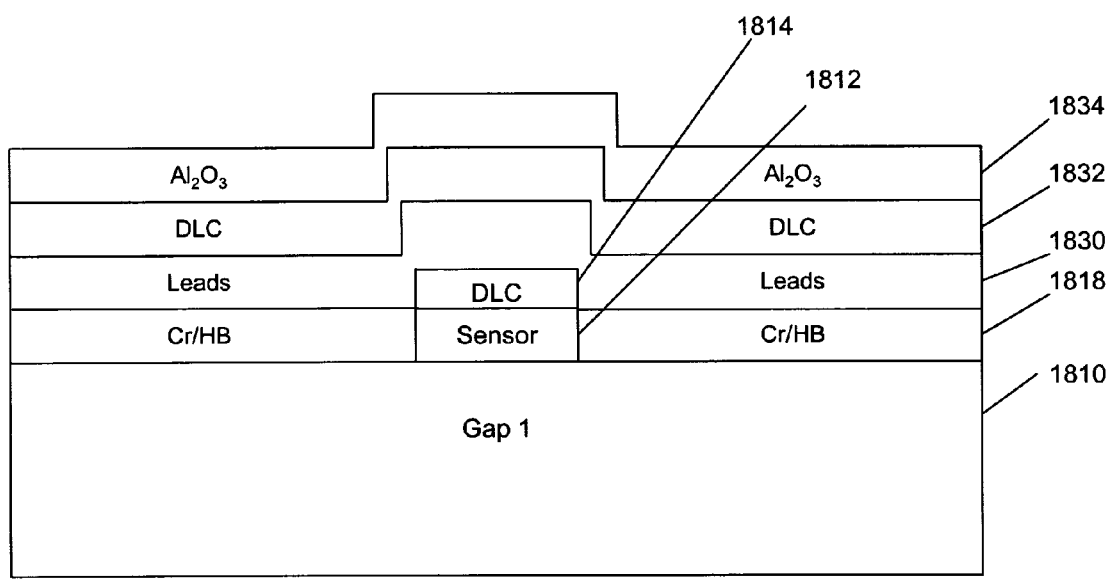
FIG. 18 illustrates a lead layer, another DLC layer and another layer of $Al_2O_3$ layer deposited over the first DLC layer and the hard bias layer according to an embodiment of the present invention.
Figure 19:
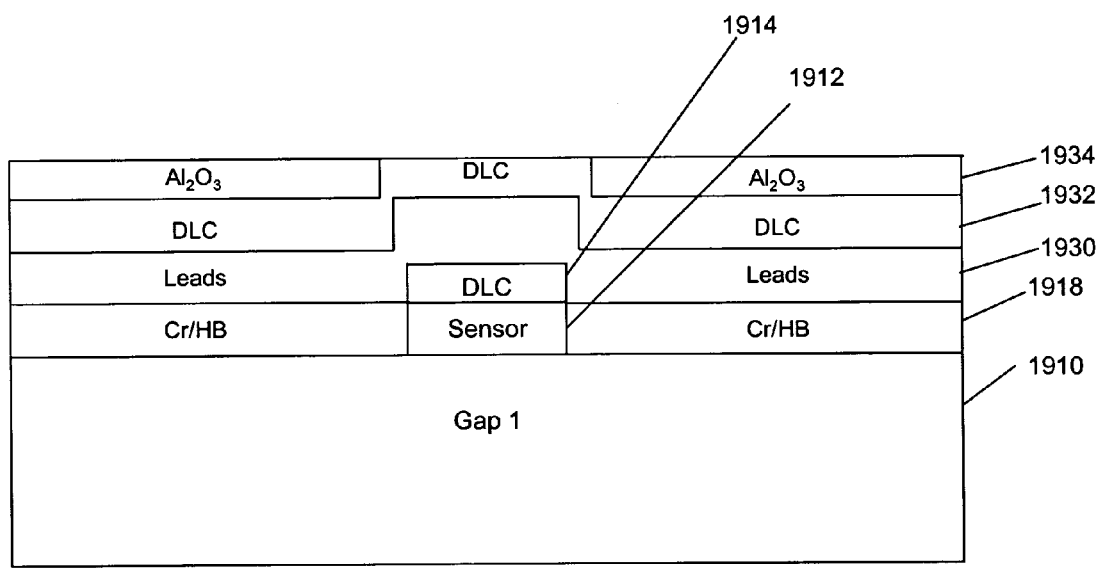
FIG. 19 shows CMP polishing of the $Al_2O_3$ layer down to the level of the DLC layer according to an embodiment of the present invention.

FIG. 18 illustrates a lead layer 1830, another DLC layer 1832 and another layer of $Al_2O_3$ layer 1834 deposited over the first DLC layer 1814 and the hard bias layer 1818. The sensor 1812 is disposed over the gap 1 layer 1810. FIG. 19 shows the $Al_2O_3$ layer 1934 CMP polished down to the level of the second DLC layer 1932, which is deposited over the lead layer 1930. The first DLC layer 1914 is disposed over the sensor 1912, which in turn is disposed over the gap 1 layer 1910.

Figure 20:
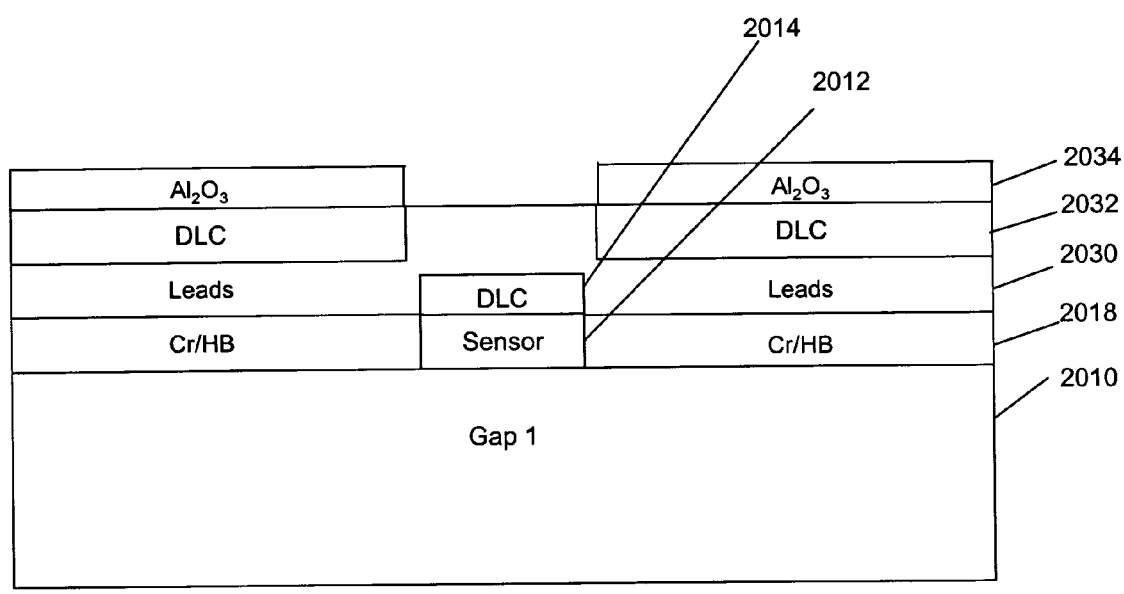
FIG. 20 shows the DLC layer between the remaining portions of the $Al_2O_3$ layer removed by reactive ion etching (RIE) according to an embodiment of the present invention.

FIG. 20 shows the DLC layer 2032 that is between the remaining portions of the $Al_2O_3$ layer 2034 removed by, for example, reactive ion etching (RIE). The second DLC layer 1932 is shown over the lead layer 1930. The lead layer 2030 is shown over the hard bias layer 2018. The first DLC layer 2014 is disposed over the sensor 2012, which in turn is disposed over the gap 1 layer 2010.

Figure 21:
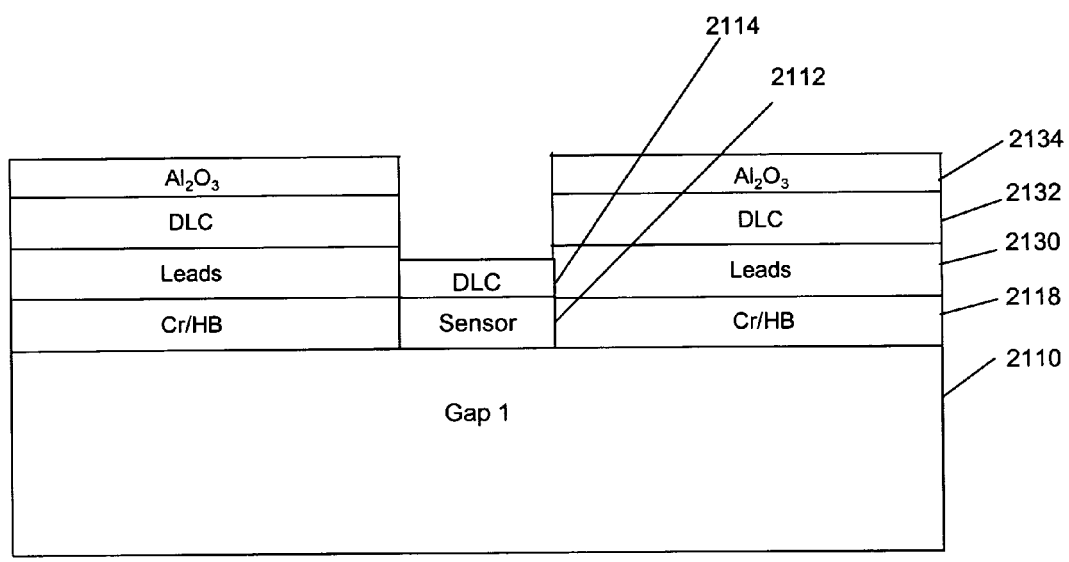
FIG. 21 shows the lead material between the DLC layers removed by ion milling according to an embodiment of the present invention.
Figure 22:
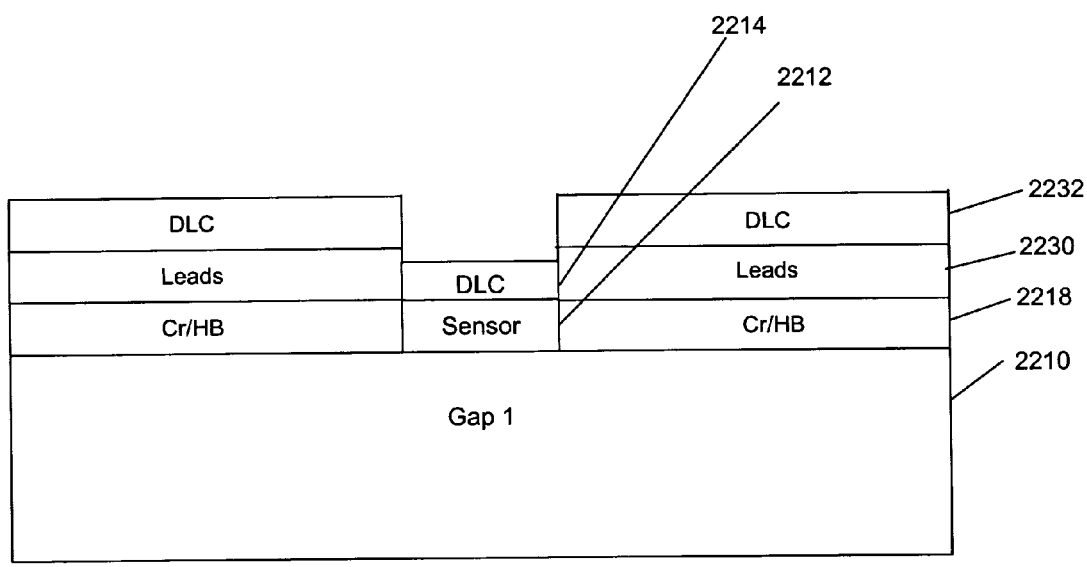
FIG. 22 shows the $Al_2O_3$ layer removed using wet etching according to an embodiment of the present invention.

FIG. 21 shows the lead material 2130 between the DLC layers 2132 removed by, for example, ion milling. This process also removes portions of the $Al_2O_3$ layer 2134 to reduce its thickness. The first DLC layer 2114 is disposed over the sensor 2112, which in turn is disposed over the gap 1 layer 2110. FIG. 22 shows the $Al_2O_3$ layer 2134 of FIG. 21 removed using, for example, wet etching and thereby leaving the second DLC layers 2232. The lead layer 2230 is shown over the hard bias layer 2218. The first DLC layer 2214 is disposed over the sensor 2212, which in turn is disposed over the gap 1 layer 2210.

Figure 23:
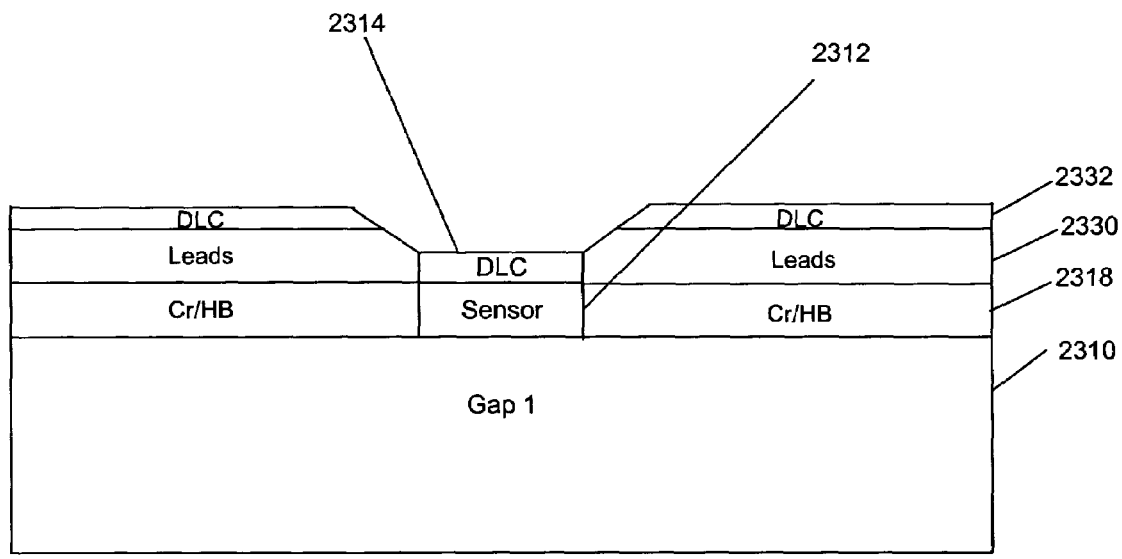
FIG. 23 shows CMP polished lead layer and DLC layer according to an embodiment of the present invention.

FIG. 23 shows the lead layer 2330 and the DLC layer 2332 CMP polished to shape the leads. A portion of the second DLC layer 2332 remains along with the first DLC layer 2314. The lead layer 2330 is shown over the hard bias layer 2318. The sensor 2312 is disposed over the gap 1 layer 2310.

Figure 24:
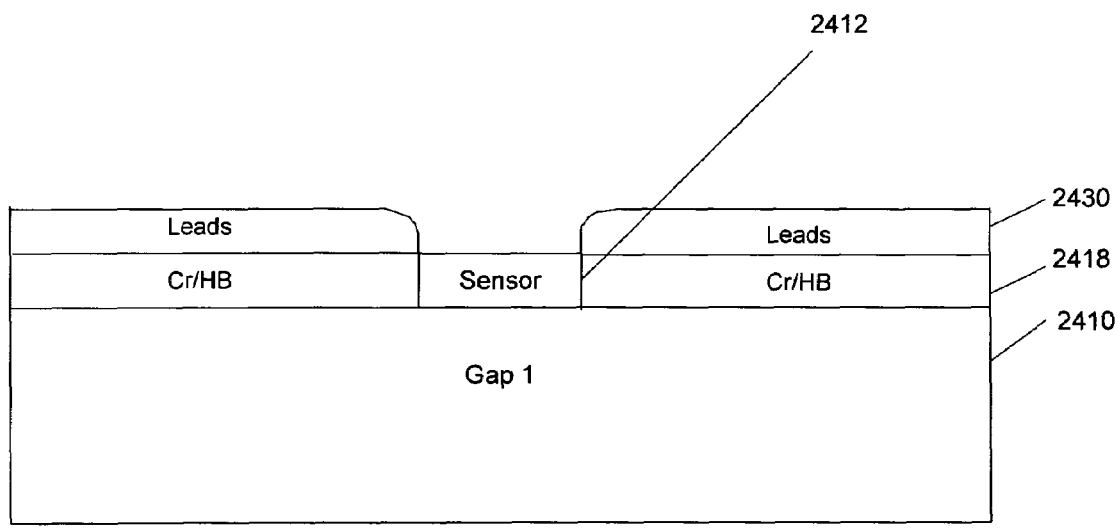
FIG. 24 shows the second DLC layer and the first DLC layer removed according to an embodiment of the present invention.

In FIG. 24, the second DLC layer 2332 and the first DLC layer 2314 of FIG. 23 are removed using, for example, RIE. The leads 2430 to the sensor 2412 are shaped over the hard bias layers 2418 and gap 1 layer 2410. The lead layer 2430 is shown over the hard bias layer 2418. The sensor 2412 is disposed over the gap 1 layer 2410.

Accordingly, the present invention provides a method for forming a read transducer by ion milling and chemical mechanical polishing to eliminate nonuniformity near the MR sensor. By eliminating the resist mask in the read transducer formation process, the thickness of the layers near the read transducer has a uniform thickness.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for forming a read transducer, comprising:
    forming, over a sensor, a first hard layer having a width for defining a width of the sensor;
    forming, on a first and second side of the sensor and hard layer, a hard bias layer having a height substantially equal to a height of the sensor;
    forming a lead layer over the hard layer and the hard bias layer;
    forming a second hard layer over the lead layer;
    forming, over the second hard layer, a top mask layer having an opening substantially equal to the width of the sensor;
    removing a portion of the second hard layer and a portion of the lead layer accessible through the opening in the top mask layer;
    removing the top mask layer; and
    shaping a remaining portion of the second hard layer and a remaining portion of the lead layer to a desired form.

2. The method of claim 1 wherein the forming, over a sensor, a first hard layer having a width for defining a width of the sensor further comprises forming a sensor layer, forming a first hard layer over the sensor layer, forming a photoresist over the hard layer where the sensor is to be formed and removing portions of the first hard layer and the sensor layer that are not obscured by the photoresist.

3. The method of claim 1 wherein the removing portions of the first hard layer and the sensor layer that are not obscured by the photoresist further comprises ion milling portions of the first hard layer and the sensor layer that are not obscured by the photoresist.

4. The method of claim 2, wherein the forming, on a first and second side of the sensor and hard layer, a hard bias layer having a height substantially equal to a height of the sensor further comprises depositing a hard bias layer over and around the first hard layer having a width for defining the sensor, ion milling a portion of the hard bias layer until the hard bias layer comprises a first and second side portion opposite the sensor and first hard layer and a third portion over the first hard layer, depositing a bottom mask layer over the ion milled portion of the hard bias layer and the first hard layer, chemical mechanical polishing the bottom mask layer and the portion of the hard bias layer over the first hard layer until the first hard layer is encountered and wet etching the bottom mask layer and hard bias layer until the hard bias layer has a desired height.

5. The method of claim 4, wherein the depositing, over the second hard layer, a top mask layer having an opening substantially equal to the width of the sensor further comprises forming a top mask layer over the second hard layer and CMP polishing the top mask layer down to the second hard layer.

6. The method of claim 5, wherein the removing a portion of the second hard layer and a portion of the lead layer accessible through the opening in the top mask layer further comprises removing a portion of the second hard layer between the opening in the top mask layer using reactive ion etching (RIE) and removing a portion of the lead layer between remaining portions of the second hard layer by ion milling.

7. The method of claim 6, wherein the removing the top mask layer further comprise wet etching the top mask layer to remove the top mask layer.

8. The method of claim 7, wherein the shaping a remaining portion of the second hard layer and a remaining portion of the lead layer to a desired form further comprises CMP polishing the first hard layer and remaining portions of the lead layer and the second hard layer to remove portions of the remaining portions of the lead layer and the second hard layer away from the sensor to provide the remaining portions of the lead layer a surface sloping toward the first hard layer.

9. The method of claim 8, wherein the shaping a remaining portion of the second hard layer and a remaining portion of the lead layer to a desired form further comprises removing the first hard layer and the remaining portions of the second hard layer using reactive ion etching.

10. The method of claim 1, wherein the forming, on a first and second side of the sensor and hard layer, a hard bias layer having a height substantially equal to a height of the sensor further comprises depositing a hard bias layer over and around the first hard layer, ion milling a portion of the hard bias layer until the hard bias layer comprises a first and second side portion opposite the sensor and fist hard layer and a third portion over the first hard layer, depositing a bottom mask layer over the ion milled portion of the hard bias layer and the first hard layer, chemical mechanical polishing the bottom mask layer and the portion of the hard bias layer over the first hard layer until the first hard layer is encountered and wet etching the bottom mask layer and hard bias layer until the hard bias layer has a desired height.

11. The method of claim 10, wherein the depositing the bottom mask layer further comprise forming a layer of $Al_2O_3$.

12. The method of claim 1, wherein the forming, over the second hard layer, a top mask layer having an opening substantially equal to the width of the sensor further comprises forming a top mask layer over the second hard layer and CMP polishing the top mask layer down to the second hard layer.

13. The method of claim 1, wherein the removing a portion of the second hard layer and a portion of the lead layer accessible through the opening in the top mask layer further comprises removing a portion of the second hard layer between the opening in the top mask layer using reactive ion etching (RIE) and removing a portion of the lead layer between remaining portions of the second hard layer by ion milling.

14. The method of claim 1, wherein the removing the top mask layer further comprise wet etching the mask layer to remove the top mask layer.

15. The method of claim 1, wherein the shaping a remaining portion of the second hard layer and a remaining portion of the lead layer to a desired form further comprises CMP polishing the first hard layer and remaining portions of the lead layer and the second hard layer to remove portions of the remaining portions of the lead layer and the second hard layer away from the sensor to provide the remaining portions of the lead layer a surface sloping toward the first hard layer.

16. The method of claim 13, wherein the shaping a remaining portion of the second hard layer and a remaining portion of the lead layer to a desired form further comprises removing the first hard layer and the remaining portions of the second hard layer using reactive ion etching.

17. The method of claim 1, wherein the forming the hard bias layer further comprise forming a Chromium/hard bias layer.

18. The method of claim 1, wherein the forming the first hard layer further comprise forming a diamond-like carbon layer.

19. The method of claim 1, wherein the forming the second hard layer further comprise forming a diamond-like carbon layer.

20. The method of claim 1, wherein the forming the top mask layer further comprise forming a layer of $Al_2O_3$.

21. A method for forming a read transducer, comprising:
forming a sensor layer over a first gap layer;
forming, over the sensor layer, a first hard layer;
forming over the first hard layer a photoresist having a width equal to a desired width of a sensor;
removing portions of the first hard layer and the sensor layer not blocked by the photoresist to form a sensor;
removing the photoresist;
forming a hard bias layer on a first and second side of remaining portions of the first hard layer and sensor layer; and
processing a second hard layer, a lead layer and a masking layer formed over the hard bias layer and the remaining portions of the first hard layer and sensor layer using CMP polishing, ion etching and ion milling to prevent nonuniformity of layer thickness near the sensor.

22. The method of claim 21, wherein the forming a hard bias layer on a first and second side of remaining portions of the first hard layer and sensor layer further comprises depositing a hard bias layer over and around the first hard layer, ion milling a portion of the hard bias layer until the hard bias layer comprises a first and second side portion opposite the remaining portions of the first hard layer and sensor layer and a third portion over the first hard layer, depositing a bottom mask layer over the ion milled portion of the hard bias layer and the first hard layer, chemical mechanical polishing the bottom mask layer and the portion of the hard bias layer over the first hard layer until the first hard layer is encountered and wet etching the bottom mask layer and hard bias layer until the hard bias layer has a desired height.

23. The method of claim 22, wherein the depositing the bottom mask layer further comprise forming a layer of $Al_2O_3$.

24. The method of claim 21, wherein the processing a second hard layer, a lead layer and a masking layer formed over the hard bias layer and the remaining portions of the first hard layer and sensor layer further comprises forming, over the second hard layer, a top mask layer having an opening substantially equal to the width of the sensor by forming a top mask layer over the second hard layer and CMP polishing the top mask layer down to the second hard layer.

25. The method of claim 24, wherein the processing a second hard layer, a lead layer and a masking layer formed over the hard bias layer and the remaining portions of the first hard layer and sensor layer further comprises removing a portion of the second hard layer and a portion of the lead layer accessible through the opening in the top mask layer.

26. The method of claim 25, wherein the removing a portion of the second hard layer and a portion of the lead layer accessible through the opening in the top mask layer further comprises removing a portion of the second hard layer between the opening in the top mask layer using reactive ion etching (RIE) and removing a portion of the lead layer between remaining portions of the second hard layer by ion milling.

27. The method of claim 25, wherein the processing a second hard layer, a lead layer and a masking layer formed over the hard bias layer and the remaining portions of the first hard layer and sensor layer further comprises removing the top mask layer further comprise wet etching the mask layer to remove the top mask layer.

28. The method of claim 21, wherein the processing a second hard layer, a lead layer and a masking layer formed over the hard bias layer and the remaining portions of the first hard layer and sensor layer further comprises shaping a remaining portion of the second hard layer and a remaining portion of the lead layer to a desired form.

29. The method of claim 28, wherein the shaping a remaining portion of the second hard layer and a remaining portion of the lead layer to a desired form further comprises CMP polishing the first hard layer and remaining portions of the lead layer and the second hard layer to remove portions of the remaining portions of the lead layer and the second hard layer away from the sensor to provide the remaining portions of the lead layer a surface sloping toward the first hard layer.

30. The method of claim 29, wherein the shaping a remaining portion of the second hard layer and a remaining portion of the lead layer to a desired form further comprises removing the first hard layer and the remaining portions of the second hard layer using reactive ion etching.

31. The method of claim 21, wherein the forming the first and second hard layers further comprise forming a diamond-like carbon layer.

\* \* \* \* \*